(12) United States Patent
Kang et al.

(10) Patent No.: US 8,229,648 B2
(45) Date of Patent: *Jul. 24, 2012

(54) METHOD AND APPARATUS FOR CONTROLLING FUEL INJECTION IN A HOMOGENEOUS CHARGE COMPRESSION IGNITION ENGINE

(75) Inventors: Jun-Mo Kang, Ann Arbor, MI (US);
Chen-Fang Chang, Troy, MI (US);
Jyh-Shin Chen, Troy, MI (US);
Tang-Wei Kuo, Troy, MI (US);
Man-Feng Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1197 days.

This patent is subject to a terminal disclaimer.

(21) Appl. No.: 12/031,212

(22) Filed: Feb. 14, 2008

(65) Prior Publication Data
US 2008/0221781 A1    Sep. 11, 2008

Related U.S. Application Data

(60) Provisional application No. 60/893,143, filed on Mar. 6, 2007.

(51) Int. Cl.
*F02M 7/28* (2006.01)
(52) U.S. Cl. ..... 701/103; 701/111; 123/435; 123/406.47
(58) Field of Classification Search .......... 701/101–105, 701/111, 112; 123/294, 305, 435, 436, 406.14, 123/406.2, 406.22–406.3, 406.47
See application file for complete search history.

(56) References Cited

U.S. PATENT DOCUMENTS

| | | | |
|---|---|---|---|
| 6,055,948 | A | 5/2000 | Shiraishi et al. |
| 6,615,129 | B2 | 9/2003 | Kabasin |
| 6,662,785 | B1 | 12/2003 | Sloane et al. |
| 6,758,177 | B1 | 7/2004 | McKay et al. |
| 6,912,992 | B2 | 7/2005 | Ancimer et al. |
| 6,947,830 | B1 | 9/2005 | Froloff et al. |
| 6,971,365 | B1 | 12/2005 | Najt et al. |
| 6,994,072 | B2 | 2/2006 | Kuo et al. |
| 7,059,281 | B2 | 6/2006 | Kuo et al. |
| 7,063,068 | B2 | 6/2006 | Nakai et al. |
| 7,077,084 | B2 | 7/2006 | Mallebrein |
| 7,080,613 | B2 | 7/2006 | Kuo et al. |
| 7,128,062 | B2 | 10/2006 | Kuo et al. |
| 7,156,070 | B2 | 1/2007 | Strom et al. |
| 7,171,924 | B2 | 2/2007 | Robel et al. |
| 7,689,343 | B2 * | 3/2010 | Dagci et al. .................. 701/103 |
| 7,742,868 | B2 * | 6/2010 | Kang et al. .................... 701/105 |
| 2006/0144356 | A1 | 7/2006 | Sellnau et al. |

(Continued)

OTHER PUBLICATIONS

Haraldsson, G; HCCI Combustion Phasing with Closed-Loop Combustion Control Using Variable Compression Ratio in a Multi-Cylinder Engine; 2003 JSAE/SAE Fuels& Lub Meeting; SAE 2003-01-1830; Yokohama, JP.

*Primary Examiner* — John Kwon

(57) ABSTRACT

A multi-cylinder internal combustion engine is operative in a controlled auto-ignition combustion mode. The operation includes monitoring engine operation, and globally adapting fueling for all the cylinders based upon an engine intake mass air flow and an air/fuel ratio. The fueling for each cylinder is individually adapted based upon states of a combustion parameter for all the cylinders.

20 Claims, 3 Drawing Sheets

U.S. PATENT DOCUMENTS

| | | |
|---|---|---|
| 2006/0196466 A1 | 9/2006 | Kuo et al. |
| 2006/0196467 A1 | 9/2006 | Kang et al. |
| 2006/0196468 A1 | 9/2006 | Chang et al. |
| 2006/0196469 A1 | 9/2006 | Kuo et al. |
| 2006/0236958 A1 | 10/2006 | Sun et al. |
| 2006/0243241 A1 | 11/2006 | Kuo et al. |
| 2009/0164104 A1* | 6/2009 | Wermuth et al. ............ 701/105 |

* cited by examiner

METHOD AND APPARATUS FOR CONTROLLING FUEL INJECTION IN A HOMOGENEOUS CHARGE COMPRESSION IGNITION ENGINE

CROSS REFERENCE TO RELATED APPLICATIONS

This application claims priority from U.S. Provisional Application No. 60/893,143, filed on Mar. 6, 2007, which is hereby incorporated herein by reference.

TECHNICAL FIELD

This disclosure relates to operation and control of internal combustion engines, and more specifically to homogeneous-charge compression-ignition ('HCCI') engines.

BACKGROUND

The statements in this section merely provide background information related to the present disclosure and may not constitute prior art.

Known spark ignition engines introduce a fuel/air mixture into each cylinder which is compressed in a compression stroke and ignited by a spark plug. Known compression ignition engines inject pressurized fuel into a combustion cylinder near top dead center ('TDC') of the compression stroke which ignites upon injection. Combustion for both gasoline engines and diesel engines involves premixed or diffusion flames controlled by fluid mechanics.

An engine configured for spark ignition can be adapted to operate in a homogeneous charge compression ignition ('HCCI') mode, also referred to as controlled auto-ignition combustion, under predetermined speed/load operating conditions. The controlled auto-ignition combustion comprises a distributed, flameless, auto-ignition combustion process that is controlled by oxidation chemistry. An engine operating in the HCCI mode has an intake charge that is preferably homogeneous in composition, temperature, and residual exhaust gases at intake valve closing time. Controlled auto-ignition combustion is a distributed kinetically-controlled combustion process with the engine operating at a dilute fuel/air mixture, i.e., lean of a fuel/air stoichiometric point, with relatively low peak combustion temperatures, resulting in low NOx emissions. The homogeneous fuel/air mixture minimizes occurrences of rich zones that form smoke and particulate emissions.

When an engine operates in the HCCI mode, the engine control comprises lean air/fuel ratio operation with the throttle wide open to minimize engine pumping losses. When the engine operates in the spark-ignition combustion mode, the engine control comprises stoichiometric air/fuel ratio operation, with the throttle valve controlled over a range of positions from 0% to 100% of the wide-open position to control intake airflow to achieve the stoichiometric air/fuel ratio. It is known that combustion in each cylinder can vary significantly due to differences in individual fuel injector characteristics and other factors in a multi-cylinder HCCI engine.

SUMMARY

A multi-cylinder internal combustion engine is operative in a controlled auto-ignition combustion mode. The operation includes monitoring engine operation, and globally adapting fueling for all the cylinders based upon an engine intake mass air flow and an air/fuel ratio. The fueling for each cylinder is individually adapted based upon states of a combustion parameter for all the cylinders.

BRIEF DESCRIPTION OF THE DRAWINGS

One or more embodiments will now be described, by way of example, with reference to the accompanying drawings, in which.

DETAILED DESCRIPTION

Figure 1:
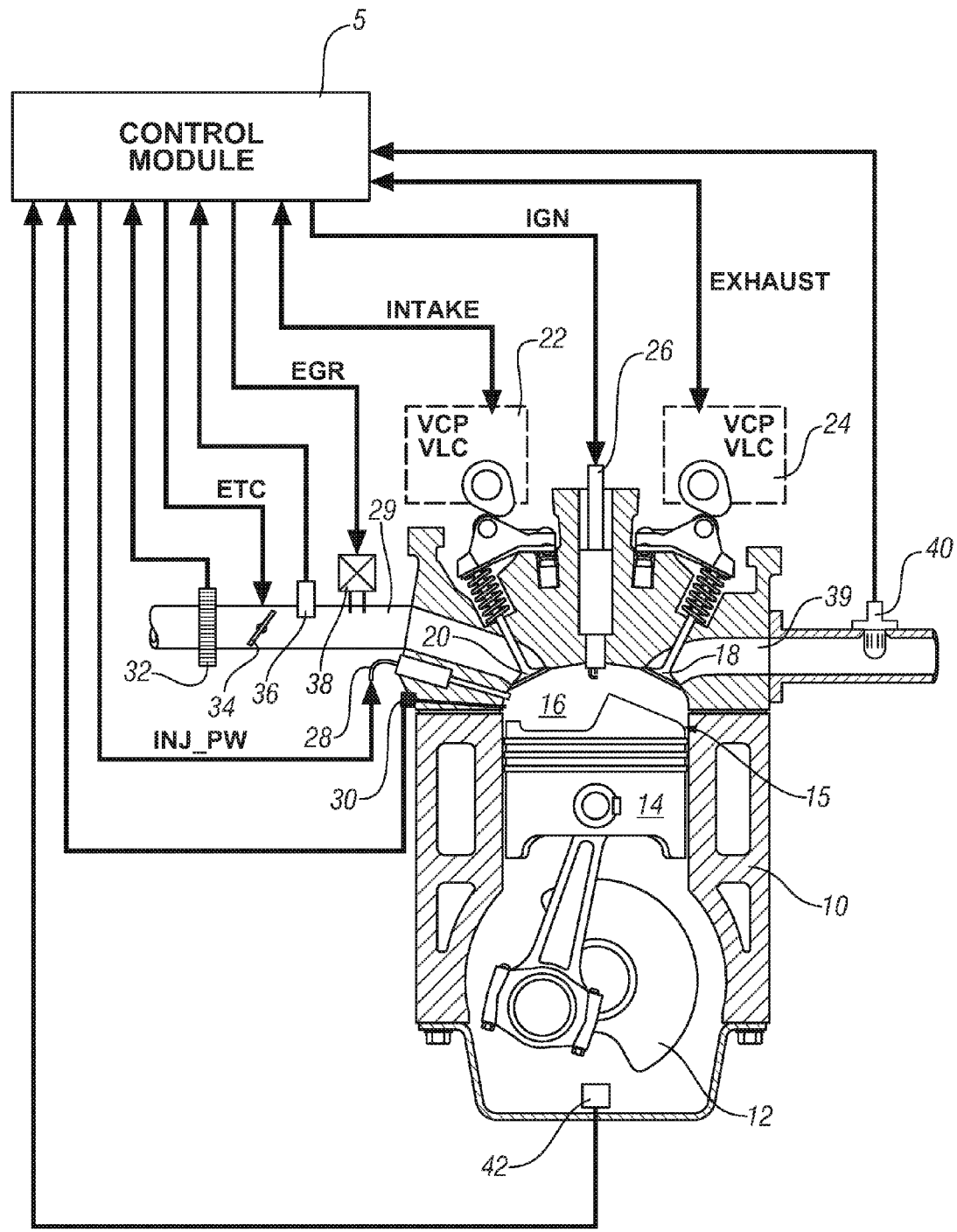
FIG. 1 is a schematic diagram of an engine system, in accordance with the present disclosure.

Referring now to the drawings, wherein the showings are for the purpose of illustrating certain exemplary embodiments only and not for the purpose of limiting the same, FIG. 1 schematically illustrates an internal combustion engine 10 and accompanying control module 5 ('CONTROL MODULE') that have been constructed in accordance with an embodiment of the disclosure. The engine 10 is selectively operative in a controlled auto-ignition mode and a spark-ignition mode. The engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system comprises airflow ductwork and devices for monitoring and controlling the air flow. The devices preferably include a mass airflow sensor 32 for monitoring mass airflow and intake air temperature. A throttle valve 34, preferably comprising an electronically controlled device controls air flow to the engine 10 in response to a control signal ('ETC') from the control module 5. A pressure sensor 36 is adapted to monitor manifold absolute pressure and barometric pressure in the intake manifold 29. An external flow passage (not shown) recirculates exhaust gases from engine exhaust to the intake manifold 29, controlled by an exhaust gas recirculation control valve 38 ('EGR control valve'). The control module 5 controls mass flow of exhaust gas to the engine air intake by controlling opening of the EGR control valve 38.

Air flow from the intake passage into the combustion chamber 16 is controlled by one or more intake valve(s) 20. Exhaust flow out of the combustion chamber 16 is controlled by one or more exhaust valve(s) 18 to an exhaust manifold 39 including a plurality of exhaust passages. Openings and closings of the intake and exhaust valves 20 and 18 are preferably controlled with a dual camshaft (as depicted), the rotations of which are linked and indexed with rotation of the crankshaft 12. Device 22 preferably comprises a controllable mechanism operative to variably control valve lift ('VLC') and variably control cam phasing ('VCP') of the intake valve(s) 20 for each cylinder 15 in response to a control signal ('INTAKE') from the control module 5. Device 24 preferably comprises a controllable mechanism operative to variably control valve lift ('VLC') and variably control cam phasing ('VCP') of the exhaust valve(s) 18 for each cylinder 15 in response to a control signal ('EXHAUST') from the control module 5. Devices 22 and 24 each preferably comprises a controllable two-step valve lift mechanism operative to control magnitude of valve lift, or opening, to one of two discrete steps, e.g., a low-lift valve open position (about 4-6 mm) for load speed, low load operation, and a high-lift valve open position (about 8-10 mm) for high speed and high load operation. Devices 22 and 24 comprise variable cam phasing mechanisms to control phasing (i.e., relative timing) of opening and closing of the intake valve(s) 20 and the exhaust valve(s) 18 respectively. The variable cam phasing mechanisms shift valve opening time relative to positions of the crankshaft 12 and piston 14, referred to as phasing. The VCP system preferably has a range of phasing authority of about 60°-90° of crank rotation, thus permitting the control module 5 to advance or retard opening and closing of one of the intake valves 20 and the exhaust valves 18 relative to position of the piston 14. The range of phasing authority is defined and limited by the devices 22 and 24. Devices 22 and 24 include camshaft position sensors (not shown) to determine rotational positions of the intake and the exhaust camshafts (not shown). Devices 22 and 24 are actuated using one of electro-hydraulic, hydraulic, and electric control force, controlled by the control module 5.

The engine 10 includes a fuel injection system, comprising a plurality of high-pressure fuel injectors 28 each adapted to directly inject a mass of fuel into the combustion chamber 16, in response to a control signal ('INJ_PW') from the control module 5. As used herein, fueling refers to a mass fuel flow into one of the combustion chambers 16. The fuel injectors 28 are supplied pressurized fuel from a fuel distribution system (not shown).

The engine includes a spark ignition system by which spark energy is provided to a spark plug 26 for igniting or assisting in igniting cylinder charges in each combustion chamber 16, in response to a control signal ('IGN') from the control module 5. The spark plug 26 enhances control of combustion timing in each cylinder 15 of the engine 10 at certain conditions, e.g., during cold start and near a low load operation limit.

The engine 10 is equipped with various sensing devices for monitoring engine operation, including a crank sensor 42 operative to monitor crankshaft rotational position, i.e., crank angle and speed, a wide range air/fuel ratio sensor 40 adapted to monitor air/fuel ratio in the exhaust gas feedstream, and a combustion sensor 30 adapted to monitor in-cylinder combustion in real-time, during ongoing operation of the engine 10. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (hereafter 'IMEP') for each cylinder 15 for each combustion cycle. Alternatively, other sensing systems can be used to monitor real-time in-cylinder combustion parameters which can be translated into combustion phasing, e.g., ion-sense ignition systems and non-intrusive cylinder pressure monitoring systems.

During operation in the controlled auto-ignition combustion mode, the engine 10 operates un-throttled on gasoline or other fuel blends over an extended range of engine speeds and loads. The engine 10 operates in the spark ignition combustion mode with a controlled throttle operation under conditions not conducive to the controlled auto-ignition combustion mode operation, and to achieve engine power to meet an operator torque request. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present disclosure.

The control module 5 preferably comprises a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital conversion circuitry and digital to analog circuitry, and input/output circuitry and devices, and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

Figure 2:
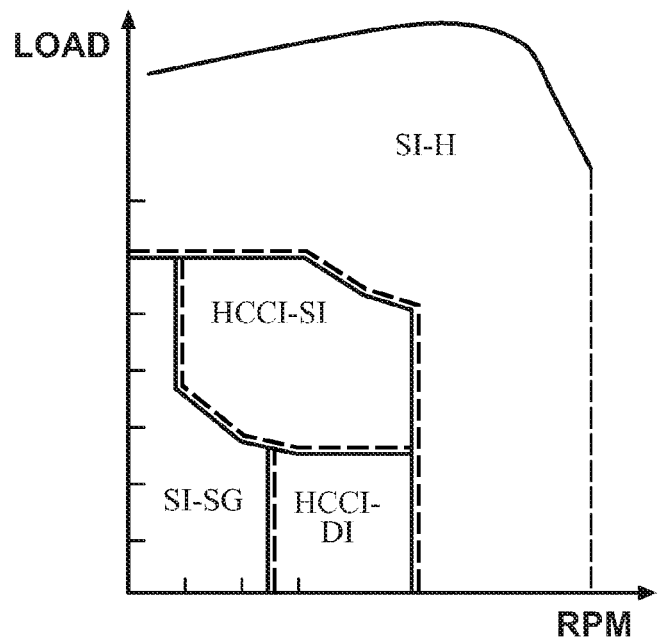
FIG. 2 is a data graph, in accordance with the present disclosure.

FIG. 2 schematically depicts preferred operating ranges for the exemplary engine 10 in spark-ignition and controlled auto-ignition combustion modes, based upon states of engine parameters, in this embodiment comprising speed ('RPM') and load ('LOAD') which is derivable from engine parameters including the engine fuel flow and the intake manifold 29 pressure. The engine combustion modes preferably comprise a spray-guided spark-ignition ('SI-SG') mode, a single injection controlled auto-ignition ('HCCI-SI') mode, and double injection controlled auto-ignition ('HCCI-DI') mode, and a homogeneous spark-ignition ('SI-H') mode. A preferred speed and load operating range for each of the combustion modes is based upon engine operating parameters, including combustion stability, fuel consumption, emissions, engine torque output, and others. Boundaries which define the preferred speed and load operating ranges to delineate operation in the aforementioned combustion modes are preferably precalibrated and stored in the control module 5.

Figure 3:
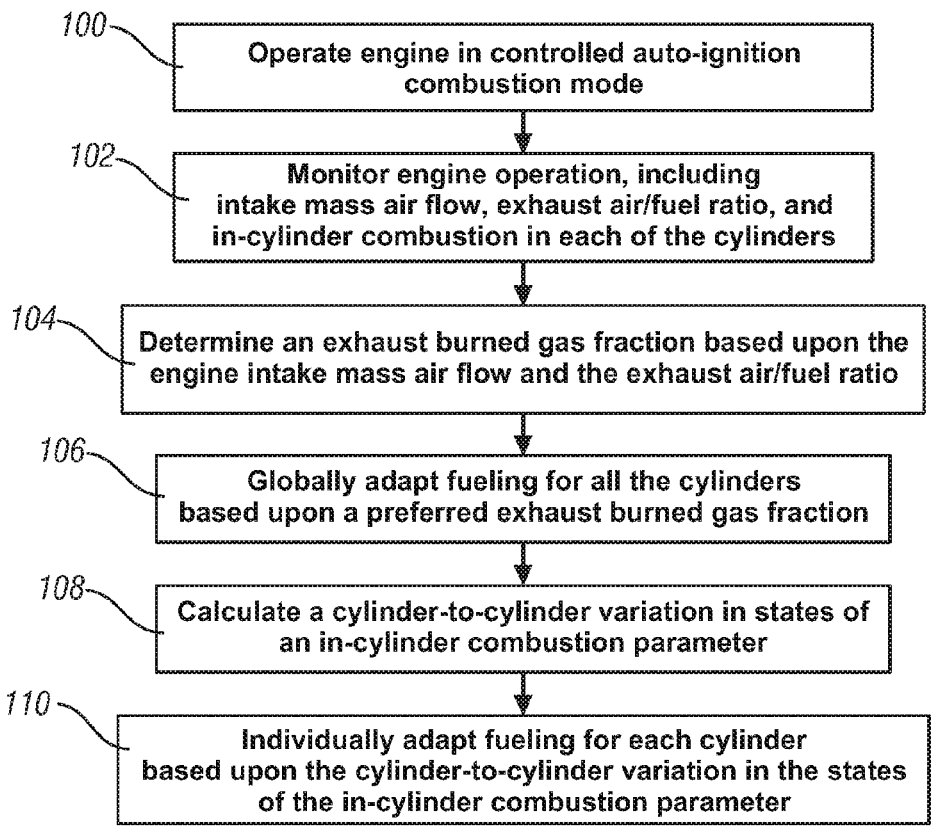
FIG. 3 is a flowchart, in accordance with the present disclosure.

FIG. 3 depicts a flowchart for operating the internal combustion engine 10. The engine 10 is operated in the controlled auto-ignition combustion mode (100). Operation of the engine 10 is monitored, including engine states comprising the intake mass airflow, the air/fuel ratio in the exhaust gas feedstream, and the in-cylinder combustion in each of the cylinders 15 (102). An exhaust burned gas fraction is determined based upon the intake mass airflow and the air/fuel ratio in the exhaust gas feedstream (104). Fueling for the cylinders 15 is globally adapted based upon a preferred exhaust burned gas fraction (106). A cylinder-to-cylinder variation in states of an in-cylinder combustion parameter is calculated (108). Fueling to each cylinder 15 is individually adapted based upon the calculated cylinder-to-cylinder variation in the states of the in-cylinder combustion parameter (110).

The control module 5 controls operation of the engine 10 in the controlled auto-ignition mode based upon the engine speed and load operating conditions described with reference to FIG. 2. The controlled auto-ignition mode preferably includes operating the engine 10 with the throttle valve 34 commanded wide-open, and with the spark ignition disabled. Fuel injection timing and mass are calculated and executed to create a homogeneous fuel/air charge in each combustion chamber 16 which achieves an engine speed/load operating point to meet engine and operator demands. The control method is reduced to executable algorithmic code stored in the control module 5. The algorithmic code preferably comprises two parts, including an algorithm to globally adapt fueling for all the cylinders 15 based on the intake mass air flow and the air/fuel ratio in the exhaust gas feedstream, and an algorithm operative to individually adapt fueling for each cylinder 15 based on the combustion phasing in the cylinder 15.

The algorithm to globally adapt fueling for all the cylinders 15 includes monitoring the mass air flow sensor 32 to determine the intake mass air flow and monitoring the wide range air/fuel ratio sensor 40 to determine the air/fuel ratio in the exhaust gas feedstream, from which the control module 5 determines a burned gas fraction. The algorithm to globally adapt fueling for all the cylinders 15 is executed based upon the following equations which are converted to machine code for execution in the control module 5. The fueling, or mass fuel flow, is adapted by adjusting the injector pulsewidths for the fuel injectors 28 for all the cylinders 15 based upon an injection error, as described. Under un-throttled operating conditions, a dynamic model of burned gas fractions in the intake manifold 29 and the exhaust manifold 39 can be expressed as in Eq. 1:

$$\dot{f}_{int} = \frac{(f_{exh} - f_{int}) \, W_{EGR} - f_{int} \, MAF}{m_{int}} \quad (1)$$

$$\dot{f}_{exh} = \frac{(f_{int} - f_{exh})(W_{EGR} + MAF) - f_{exh}W_f + (1 + \lambda_s)W_f}{m_{exh}},$$

wherein $f_{int}$ and $f_{exh}$ represent burned gas fractions in the intake manifold 29 and the exhaust manifold 39, respectively, MAF represents mass air flow through the throttle valve 34, WEGR represents EGR mass flow through the EGR control valve 38, and $W_f$ represents fueling, or mass fuel flow, through the fuel injectors 28 into the cylinders 15, mint is intake manifold 29 gas mass and $m_{exh}$ is exhaust manifold gas mass, and, $\lambda_s$ is the stoichiometric air/fuel ratio for the fuel. Since the exhaust manifold gas mass is a sum of masses of burned fuel and burned and unburned air, the burned gas fraction in the exhaust manifold 39 can be related to the air/fuel ratio in the exhaust manifold 39, as in Eq. 2:

$$f_{exh} = \frac{(1+\lambda_s)m_f}{m_f + m_a} = \frac{(1+\lambda_s)m_f}{m_f + \lambda m_f} = \frac{1+\lambda_s}{1+\lambda}, \quad (2)$$

wherein $\lambda$ is the air/fuel ratio, $m_a$ is the mass of burned and unburned air, and $m_f$ is the mass of burned fuel in the exhaust manifold 39. In practice, the intake burned gas fraction is not measured, and the exhaust burned gas fraction can be calculated using the air/fuel ratio measurement from the wide range air/fuel ratio sensor 40. Also, since the intake burned gas fraction only affects the exhaust burned gas fraction during transients, only the dynamics of exhaust burned gas fraction are considered in the adaptive algorithm, and assuming a steady-state intake burned gas fraction. In steady state operation, the intake burned gas fraction can be calculated as in Eq. 3:

$$f_{int} = \frac{W_{EGR}}{(MAF + W_{EGR})} f_{exh}. \quad (3)$$

The resulting burned gas fraction dynamics in the exhaust manifold 39 and the exhaust gas feedstream are described with reference to Eq. 4:

$$\dot{f}_{exh} = -\frac{MAF + W_f}{m_{exh}} f_{exh} + \frac{1+\lambda_s}{m_{exh}} W_f. \quad (4)$$

The ratio between the commanded fueling and the actual fueling into the cylinder 15 is defined as in Eq. 5:

$$\theta = \frac{W_f^c}{W_f^a}, \quad (5)$$

wherein $W_f^c$ is commanded mass fuel flow, or commanded fueling, into all the cylinders 15, and $W_f^a$ is actual mass fuel flow, or actual fueling, into all the cylinders 15.

The error dynamics of burned gas fraction in the exhaust gas feedstream are expressed as Eq. 6:

$$\dot{\hat{f}}_{exh} = -\frac{MAF + W_f}{m_{exh}} \hat{f}_{exh} + \frac{1+\lambda_s}{m_{exh}} W_f^d \quad (6)$$

$$\dot{e} = -\frac{MAF + W_f}{m_{exh}} e + \frac{1+\lambda_s}{m_{exh}} (W_f^a - W_f^d)$$

$$= -\frac{MAF + W_f}{m_{exh}} e + \frac{1+\lambda_s}{m_{exh}} (\theta^{-1} W_f^c - W_f^d),$$

wherein $W_f^d$ is a desired mass fuel flow, or desired fueling, to all the cylinders 15, $\hat{f}_{exh}$ is desired burned gas fraction in the exhaust gas feedstream, and e is the error comprising the difference between the actual burned gas fraction and the estimated burned gas fraction, I, $f_{exh} - \hat{f}_{exh}$. The desired fueling, $W_f^d$, is a fuel flow which achieves an engine speed/load operating point to meet engine demands which achieves an engine speed/load operating point to meet engine and the operator torque request for the selected combustion mode. The global fuel injector adaptation algorithm globally adjusts the mass fuel flow, or fueling, into all the cylinders 15 to reduce the injection error to minimize the error between the measured and the desired burned gas fractions in the exhaust gas feedstream.

The fuel command is adjusted as follows in Eq. 7:

$$W_f^c = \hat{\theta} W_f^d \quad (7)$$

resulting in error dynamics, as in Eq. 8:

$$\dot{e} = -\frac{MAF + W_f}{m_{exh}} e + \frac{1+\lambda_s}{m_{exh}} (\theta^{-1} \hat{\theta} - 1) W_f^d \quad (8)$$

wherein $\hat{\theta}$ is an estimate of $\theta$. The algorithm takes into account that the ratio $\theta$ varies slowly in time, I, $\dot{\theta} \approx 0$, and the following Lyapunov function is selected to provide for adaptation, in Eq. 9:

$$V = \frac{c_1}{2}e^2 + \frac{c_2}{2}\theta^{-1}(\hat{\theta}-\theta)^2 > 0, c_1, c_2 > 0 \quad (9)$$

wherein $c_1$ and $c_2$ are constants.

A time derivative of V is derived in Eq. 10:

$$\frac{dV}{dt} = c_1 e\left(-\frac{MAF+W_f}{m_{exh}}e + \frac{1+\lambda_s}{m_{exh}}(\theta^{-1}\hat{\theta}-1)W_f^d\right) + \quad (10)$$

$$c_2\theta^{-1}(\hat{\theta}-\theta)\frac{d\hat{\theta}}{dt}$$

$$= -c_1 \frac{MAF+W_f}{m_{exh}}e^2 +$$

$$c_2\theta^{-1}(\hat{\theta}-\theta)\left(\frac{d\hat{\theta}}{dt} + \frac{c_1}{c_2}\frac{1+\lambda_s}{m_{exh}}eW_f^d\right).$$

Since $$-c_1\frac{MAF+W_f}{m_{exh}} < 0, \forall t,$$

the adaptation law becomes as in Eq. 11:

$$\frac{d\hat{\theta}}{dt} = -\frac{c_1}{c_2}\frac{1+\lambda_s}{m_{exh}}eW_f^d \quad (11)$$

Eq. 11 is used to achieve results in Eq. 12:

$$\dot{V} = -c_1 \frac{MAF+W_f}{m_{exh}}e^2 \leq 0. \quad (12)$$

The largest invariant set in $\dot{V}=0$ is $\{e=0, \hat{\theta}=\theta\}$, and thus the adaptation law of Eq. 11 results in the error approaching zero as the estimated ratio between the commanded fueling and the actual fueling into the cylinders 15 approaches the actual ratio between the commanded fueling and the actual fueling into all the cylinders 15, which occurs over time. In this manner the commanded pulsewidth for the fuel injectors 28 for all of the cylinders 15 can be globally adapted to achieve the preferred or desired burned gas fraction in the exhaust manifold 39 and the exhaust gas feedstream.

The individual fuel injector adaptation algorithm is based upon states of a combustion parameter determined for each cylinder 15 during each combustion cycle by monitoring output from the combustion sensor 30. The preferred combustion parameter comprises a state of either the combustion phasing or IMEP, each which can be determined during ongoing operation by analyzing inputs from the combustion sensor 30. Variations caused by fuel rail pressure pulsation, manufacturing tolerances, injector fouling, and other factors can lead to variations in injector flow and injection characteristics for the individual cylinders 15. Furthermore, variations in injector flow and injection characteristics can cause cylinder-to-cylinder variations in the combustion phasing and IMEP. By way of example, excess fuel flow into one cylinder 15 advances the combustion phasing for the specific cylinder 15 compared to the other cylinders 15 due to higher residual gas temperatures therein. Furthermore, an imbalance in the combustion phasing and IMEP may be caused by other factors including variations between the cylinders 15 in terms of in-cylinder charge mass, temperature, EGR mass and other factors. Thus resulting variations leading to cylinder-to-cylinder imbalance of combustion phasing and IMEP can be managed and minimized by adapting fuel flow from the fuel injectors 28, i.e., individually controlling and adjusting fueling flow from the fuel injectors 28.

The cylinder-to-cylinder variation in states of the combustion parameter is calculated 108, and fueling to each cylinder 15 is individually adapted based upon the calculated cylinder-to-cylinder variation in the states of the combustion parameter 110, as now described. Fuel flow for each cylinder 15 can be described in Eq. 13:

$$W_{fi}^c = \alpha_i W_f^c (1 \leq i \leq n) \quad (13)$$

wherein 'n' is the number of cylinders, $\alpha_i$ and $W_{fi}^c$ are fuel injector gain and commanded fueling at the ith cylinder, respectively. The injector gains, $\alpha_1 \ldots \alpha_n$, for the n fuel injectors 28, are adjusted based on the states of the combustion parameter measured at each cylinder 15 using first and second control rules as follows, described herein for combustion phasing.

The first control rule is as follows. When $\hat{\theta} > 1$, the average fueling injected in all the cylinders 15 is smaller than that commanded, i.e., $W_f^c > W_f^a$, and thus, the individual fuel injector adaptation algorithm adjusts fuel injector gains that are larger than or equal to one based on the states of combustion phasing measured at each cylinder 15. In addition, to ensure the individual injector gains are bounded, the individual fuel injector adaptation algorithm is designed so that the injector gain for each cylinder 15, I, is $\alpha_i = 1$, $\forall t$. The adaptation law of individual fuel injector gain is detailed in Eqs. 14 and 15 based upon the injector gain and the state of the combustion parameter, $T_i$:

$$\frac{d\alpha_i}{dt} = -\gamma(T_i, T_d), \text{ if } \alpha_i < 1, T_i < T_d, \quad (14)$$

otherwise, Eq. 15 governs:

$$\frac{d\alpha_i}{dt} = \gamma(T_i - T_d), \quad (15)$$

wherein $\gamma > 0$, $T_i$ is the combustion phasing of the ith cylinder, and $T_d = \min\{T_k | \alpha_k = 1, 1 \leq k \leq n\}$. The fuel injector gain $\alpha_i$ is directly related to the amount of fuel increment requested by the adaptation algorithm to achieve the combustion phasing for the ith cylinder, $T_i$, converging to $T_d$, and it is maintained that $\alpha_i \geq 1$ in steady state.

The second control rule is as follows. When $\hat{\theta} < 1$, the average fueling into each cylinder 15 is larger than that commanded, i.e., $W_f^c < W_f^a$, and thus, the individual fuel injector adaptation algorithm adjusts fuel injector gains that are smaller than or equal to one based on the combustion phasing measured at each cylinder 15. In addition, to ensure the individual injector gains are bounded, the individual fuel injector adaptation algorithm is designed so that for one of the cylinders i, $\alpha i = 1$, $\forall t$. The adaptation law of individual fuel injector gain is given by Eq. 16:

$$\frac{d\alpha_i}{dt} = -\gamma(T_i - T_d), \text{ if } \alpha_i > 1, T_i > T_d, \quad (16)$$

otherwise, Eq. 17 governs:

$$\frac{d\alpha_i}{dt} = \gamma(T_i - T_d), \quad (17)$$

wherein $T_d = \max\{T_k | \alpha_k = 1, 1 \leq k \leq n\}$. The fuel injector gain $\alpha_i$ is directly related to the amount of fuel decrement requested by the adaptation algorithm to achieve the combustion phasing for cylinder i, $T_i$, converging to $T_d$, and it is maintained that $\alpha_i \leq 1$ in steady state. The aforementioned adaptation of fueling to each cylinder 15 employing the first and second control rules can be similarly applied to cylinder-to-cylinder variation in states of other combustion parameters, e.g., IMEP.

The fuel injector gains $\alpha_i$ are preferably stored in the control module 5 in the non-volatile memory and ongoingly updated during operation of the engine 10. The control module 5 adjusts the control signal to each fuel injector 28 based upon the corresponding fuel injector gain $\alpha_i$ as shown with reference to Eq. 13, above, to control fueling to each cylinder 15 during ongoing engine operation.

Figure 4:
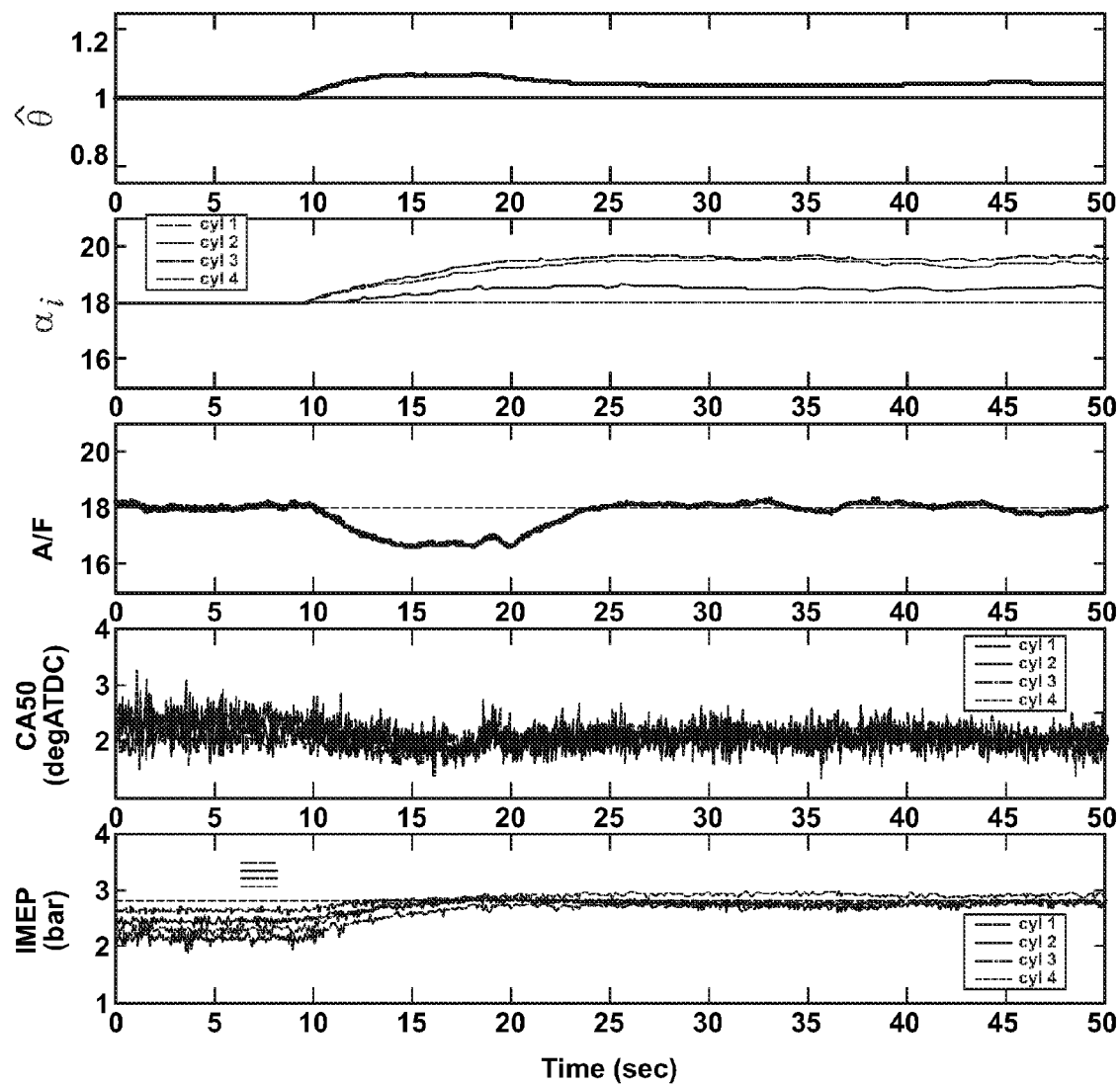
FIG. 4 is a data graph, in accordance with the present disclosure.

FIG. 4 depicts experimental test results from implementing the algorithm described hereinabove on an exemplary four-cylinder engine 10 selectively operative in the controlled auto-ignition mode. The combustion parameter used to balance the fuel injectors 28 was the combustion phasing. The engine 10 was operated unthrottled with an exhaust recompression valve strategy at a constant engine speed of 1500 RPM, and the desired fueling was set to be 9 mg/cycle/cylinder. The air/fuel ratio ('A/F') was regulated at 18:1 by a feedback controller using intake/exhaust valve timing. A control algorithm developed based upon the flowchart of FIG. 3 and the equations described hereinabove for operating the internal combustion engine 10 was activated at around 9 seconds into the depicted graphs. The specific state for combustion phasing comprised a crank-angle at 50% of a fuel burn-point ('CA50'), measured in degrees after top-dead-center ('degATDC'). Results depicted include the estimated ratio between the commanded fueling and the actual fueling into the cylinder ('$\hat{\theta}$'), the fuel injector gains for each of the four cylinders ('$\alpha_i$'), and the cylinder pressure for each of the four cylinders ('IMEP'). The results of FIG. 4 show that the ratio between the commanded fueling and the actual fueling into the cylinder 15, $\hat{\theta}$, is slowly increasing, indicating that an average amount of fuel injected in the cylinders 15 is smaller than what was actually commanded. The individual injector gain, $\alpha_i$, is slowly adjusted by the algorithm based on the measured combustion phasing. The improved balance among combustion phasing can be seen from the combustion phasing ('CA50') plot. The cylinder pressures for the cylinders 15 can be balanced, as indicated by IMEP.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of a multi-cylinder internal combustion engine operating in a controlled auto-ignition combustion mode, comprising:
   monitoring engine operation including determining a state of a combustion parameter for each cylinder;
   globally adapting fueling for all the cylinders based upon an engine intake mass air flow and an air/fuel ratio; and
   individually adapting fueling for each cylinder based upon the states of the combustion parameter for all the cylinders.

2. The method of claim 1, wherein globally adapting fueling for all the cylinders further comprises:
   determining a burned gas fraction based upon the engine intake mass air flow and the air/fuel ratio; and
   adjusting the fueling for all the cylinders to achieve a preferred burned gas fraction.

3. The method of claim 1, wherein individually adapting the fueling for each cylinder further comprises:
   determining cylinder-to-cylinder variation in the states of the combustion parameter; and
   selectively adjusting the fueling for at least one of the cylinders to reduce the cylinder-to-cylinder variation in the states of the combustion parameter.

4. The method of claim 3, wherein the combustion parameter comprises combustion phasing.

5. The method of claim 3, wherein the combustion parameter comprises a mean effective cylinder pressure.

6. The method of claim 1, comprising:
   adjusting the fueling for all the cylinders to achieve a preferred burned gas fraction; and
   selectively adjusting the fueling for at least one of the cylinders to minimize a cylinder-to-cylinder variation in the states of the combustion parameter.

7. The method of claim 1, comprising:
   substantially achieving a preferred burned gas fraction based upon the globally adapted fueling for all the cylinders; and
   reducing cylinder-to-cylinder variation in the states of the combustion parameter for the cylinders based upon the individually adapted fueling for at least one of the cylinders.

8. The method of claim 1, comprising: globally adapting the fueling for all the cylinders based upon the intake mass air flow and the air/fuel ratio during ongoing engine operation.

9. The method of claim 1, comprising:
   individually adapting the fueling for one of the cylinders based upon states of combustion phasing for all the cylinders.

10. The method of claim 1, comprising:
    selectively adjusting the fueling for one of the cylinders based upon mean effective pressures of all the cylinders.

11. The method of claim 1, wherein adapting the fueling comprises adjusting a pulsewidth of a fuel injector for the cylinder.

12. Method for controlling operation of a multi-cylinder internal combustion engine, comprising:
    operating the engine in a controlled auto-ignition combustion mode;
    monitoring engine operation including engine intake mass air flow, air/fuel ratio in an exhaust gas feedstream, and an engine parameter correlatable to in-cylinder combustion in each of the cylinders;
    controlling an exhaust burned gas fraction for the engine; and reducing cylinder-to-cylinder variation in the engine parameter by selectively adapting the fueling for at least one of the cylinders.

13. The method of claim 12, comprising:

determining the exhaust burned gas fraction based upon the engine intake mass air flow and the air/fuel ratio in the exhaust gas feedstream; and globally adjusting the fueling for all the cylinders to achieve a preferred burned gas fraction.

14. The method of claim 12, comprising:

determining cylinder-to-cylinder variation in the engine parameter correlatable to in-cylinder combustion in each of the cylinders; and selectively adjusting the fueling for at least one of the cylinders to reduce the cylinder-to-cylinder variation in the engine parameter.

15. The method of claim 12, wherein the engine parameter correlatable to in-cylinder combustion in each of the cylinders comprises combustion phasing.

16. The method of claim 12, wherein the engine parameter correlatable to in-cylinder combustion in each of the cylinders comprises a mean effective pressure.

17. Article of manufacture, comprising a storage medium having machine-executable program encoded therein operative to control a multi-cylinder internal combustion engine in a controlled auto-ignition combustion mode, the program comprising:

code to monitor signal inputs from a mass airflow sensor, an exhaust gas sensor, and in-cylinder combustion sensors;

code to determine an engine parameter correlatable to in-cylinder combustion for each of the cylinders based upon the signal inputs of the in-cylinder combustion sensors;

code to globally adapt fueling for all the cylinders based upon the signal inputs from the mass air flow sensor and the wide range air/fuel ratio sensor; and code to adapt the fueling for the individual cylinders based upon the engine parameter correlatable to in-cylinder combustion for each of the cylinders.

18. The article of claim 17, comprising:

code to determine a burned gas fraction based upon the signal inputs from the mass air flow sensor and the wide range air/fuel ratio sensor; and code to globally adapt fueling for all the cylinders to achieve a preferred burned gas fraction.

19. The article of claim 17, comprising:

code to determine the engine parameter correlatable to in-cylinder combustion for each of the cylinders;

code to determine a cylinder-to-cylinder variation in the engine parameter correlatable to in-cylinder combustion; and code to adapt the fueling for one of the individual cylinders based upon the cylinder-to-cylinder variation in the engine parameter correlatable to in-cylinder combustion.

20. The article of claim 17, comprising:

code to monitor the signal inputs from the in-cylinder combustion sensors during each combustion cycle to determine the engine parameter correlatable to in-cylinder combustion.

* * * * *